Jan. 8, 1963  B. HELFAND  3,071,973
PEAK RECORDING INSTRUMENT
Filed Sept. 8, 1959  2 Sheets-Sheet 1

INVENTOR.
BERNARD HELFAND,
By Spensley and Horn
ATTORNEYS.

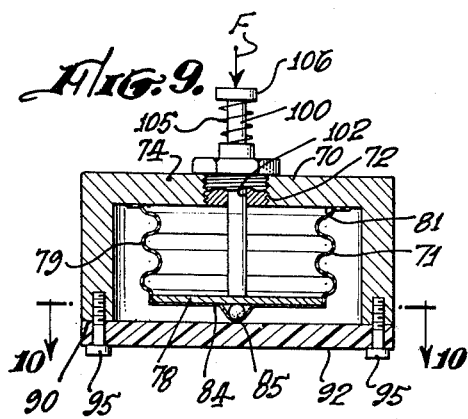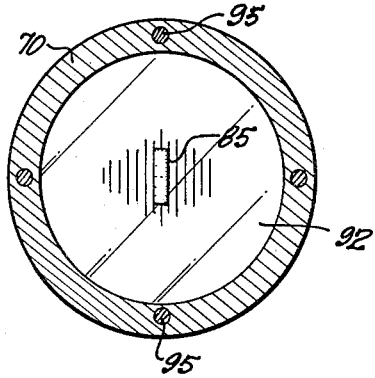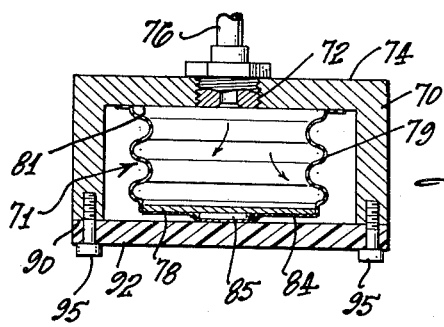

United States Patent Office 3,071,973
Patented Jan. 8, 1963

3,071,973
PEAK RECORDING INSTRUMENT
Bernard Helfand, 10104 Sunland Blvd., Sunland, Calif.
Filed Sept. 8, 1959, Ser. No. 838,687
11 Claims. (Cl. 73—492)

This invention relates to a recording instrument and more particularly to an instrument which will produce a visual indication of a peak acceleration which has been experienced by the instrument.

The device of the present invention is particularly adapted for use as a mechanical linear accelerometer. It is often important in transit of various packages or crates to determine the maximum shock to which the crate, and hence its contents, has been subjected en route. Complex electronic equipment such as a computer, for example, may be seriously damaged upon being dropped. The seller, the buyer and the shipper all have an obvious interest in determining whether a given package has been shocked beyond a predetermined value in shipment in order to establish a possible cause for the failure of the equipment to properly function after arrival at the buyer's plant.

An instrument which will follow rapidly changing acceleration, as in shock, and produce a permanent record of the peak acceleration will permit a determination of the maximum shock load. In shock, Newton's well-known equation $F=MA$, where $F=$force, $M=$mass and $A=$acceleration, clearly indicates that force can be determined from the mass and acceleration.

The present invention provides a linear accelerometer which produces a visual and permanent record of the maximum acceleration which has been experienced by a given system.

It is an object of the present invention to provide a mechanical peak linear accelerometer of improved design.

Another object of the present invention is to provide a mechanical peak linear accelerometer of high reliability which is relatively small in size and inexpensive of manufacture.

Yet another object of the present invention is to provide a device of the character described which will produce a visual record of the maximum shock acceleration to which a package has been subjected.

A further object of the present invention is to provide a device of the character described which will produce a record of the maximum pressure of a fluid in a given system.

Yet a further object of the present invention is to provide a device of the character described which will produce a record of the maximum tensile or compressive force in a mechanical member, or link, or cable, or the like.

In accordance with the present invention there is provided a casing and a mass adapted to move along the longitudinal avis of the casing. The initial or equilibrium position of the mass relative to the axis of the casing is determined by a spring connected to the casing. The end of the casing in line with the movement of the mass is closed. Provided intermediate the inner wall of this end of the casing and the mass is a body of deformable material whose initial shape will be deformable in accordance with the maximum axial displacement of the mass in the direction of the end wall of the casing.

More particularly, in accordance with the preferred embodiment of this invention, there is provided a substantially cylindrical casing within which is disposed a mass adapted to move along the longitudinal axis of the case. The initial or equilibrium position of the mass within the casing is determined by a pair of extending springs attached to the mass which are retained by a pair of shoulders defined by the inner wall of the case. The springs also provide an axial restraining force to control the movement of the mass along the longitudinal axis of the case. Positioned at opposite ends of the mass are a pair of indicator discs which include a plurality of graduated lines on the outer surface thereof. A pair of transparent plates are secured to the case or casing over each of the discs to provide a maximum limit of axial movement of the mass within the case upon acceleration or deceleration of the case. A body of deformable material is disposed intermediate the transparent plates and the outer surface of the respective discs.

The novel features which are believed to be characteristic of the present invention, together with further objects and advantages thereof, will be better understood from the following description in which the invention is illustrated by way of example. It is to be expressly understood, however, that this description is for the purpose of illustration only and that the true spirit and scope of the invention is defined by the accompanying claims.

In the drawings:

FIGURE 8 is a front view, partly in section, of a first alternate embodiment of a pressure transducer in accordance with the present invention;

FIGURE 9 is a front view partly in section of a second alternate embodiment of a pressure transducer in accordance with the present invention; and FIGURE 10 is a view take along line 10–10 of FIGURE 9.

Figure 1:
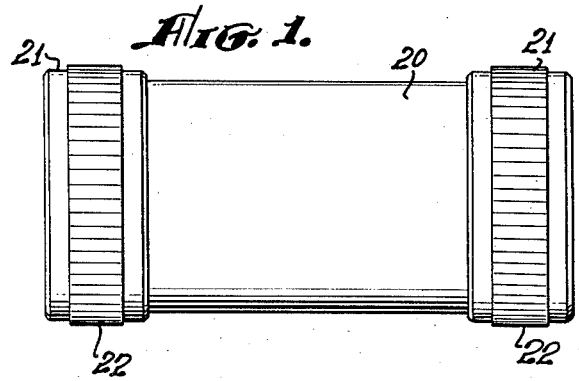
FIGURE 1 is a front elevation of an accelerometer constructed in accordance with the present invention.
Figure 2:
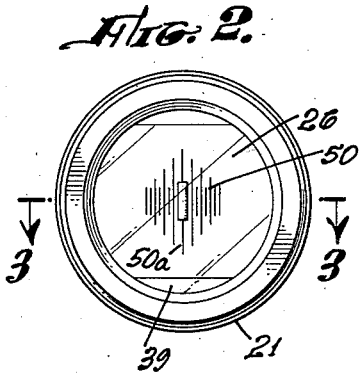
FIGURE 2 is a side elevation of the accelerometer of FIGURE 1.
Figure 3:
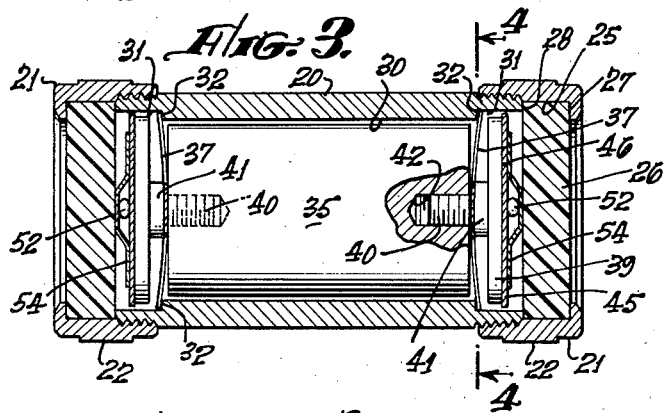
FIGURE 3 is a view take along line 3–3 of FIGURE 2.
Figure 4:
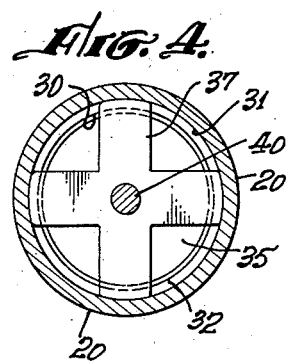
FIGURE 4 is a view taken along line 4–4 of FIGURE 3.

Referring now to the drawings there is shown in FIGURES 1, 2 and 3 a peak acceleration recording device constructed in accordance with the presently preferred embodiment of this invention. The device includes a generally cylindrically shaped hollow casing 20. Threadably secured at opposite ends of the casing 20 are a pair of retainer rings 21. The rings 21 are knurled about the periphery at 22 in order to facilitate gripping thereof. Each of the retainer rings 21 defines a central cylindrical opening 25 which is coaxial with that of the hollow casing 20. The opening 25 has an inside diameter which approximates the outside diameter of the casing 20 as may best be seen in FIGURE 3. At the longitudinal outer end of the retainer rings 21 there is provided a lip extending radially inwardly to define a circumferential shoulder 27. A transparent cylindrical disc 26 is disposed between the shoulder 27 and the end 28 of the casing 20. As can be seen in FIGURE 3 the casing 20 defines a longitudinal cylindrical opening 30 of uniform transverse circular cross-section. Proximate the opposite ends 28 of the casing 20 there are provided cylindrical openings 31 having an increased diameter relative to the opening 30 which are coaxial therewith, resulting in a shoulder region 32.

Mateably disposed within the central opening 30 is a solid cylindrical mass 35 which is free to move along the longitudinal axis of the case 20. Secured to each end of the mass 35 is a cross-shaped spring 37. A wafer shaped plug member 39 including an extending integral threaded screw section 40 and an intermediate shoulder section 41 is threaded within holes 42 provided within opposed ends of the mass 35 in order to hold the springs 37 against the end of the mass 35. The length of the mass 35 is purposely made somewhat shorter than that of section 30 of the casing 20 thus requiring the springs 37 to be bent in order to have the ends thereof rest upon the shoulder 32. Thus, the mass is maintained in the central section of the casing by a predetermined spring force which is a function of the design of the springs 37. The springs 37 are shown to be bent in FIGURE 3 to exaggerate their function. A thin disc 45 is disposed adjacent the outer surface 46 of the plug member 39.

Figure 7:
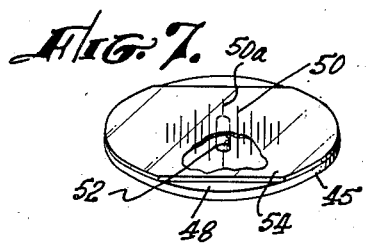
FIGURE 7 is a perspective view of the indicating means associated with the device shown in the above views.

For purposes of clarity the disc 45 is shown in perspective in FIGURE 7 removed from the casing 20. Upon the upper surface 48 of the disc 45 there are provided a plurality of engraved linear graduations 50. It has been found desirable to provide a dark coating upon surface 48 in order to have the graduations 50 better stand out. Alternatively dark lines on a white background may be used.

Along the central line 50a there is placed a generally cylindrically shaped body 52 of a plastic deformable material such as clay. The body 52 is held in position along line 50a by means of a strip of transparent tape 54. The combined thickness of the tape 54, the body 52, the disc 45, the shoulder section 41 and the spring 37 is made to be substantially equal to the length of the opening 31 along the longitudinal axis of the casing 20. Thus, with the device in equilibrium and with the transparent disc secured in place against the end of the casing 20 by means of the ring 21, the body 52 will retain its original shape.

The operation of the device of FIGURES 1-4 will now be explained. One or more devices of the character described are placed within a container housing the piece of equipment whose shock history is to be recorded. As the present invention device will only indicate the vector of the peak force to which it has been subjected which is parallel with its central axis, it may be necessary to provide three such devices in a given crate in order to record the maximum shock in any direction.

The casing 20 is firmly secured within the crate by any means such as a clamp. If a crate is now imagined as surrounding the casing 20, any acceleration or deceleration in the direction of arrow 60 (see FIGURE 5) will cause the mass 35 to move in the direction opposite the force producing the acceleration or deceleration. The inertia of the mass 35 will cause it to exert a force against the springs 37 resulting in a temporary linear displacement of the mass 35 within the casing 20 along the longitudinal axis thereof. When the system returns to equilibrium, the restoring force of the springs 37 will urge the mass 35 back into its normal position as shown in FIGURE 3.

Figure 5:
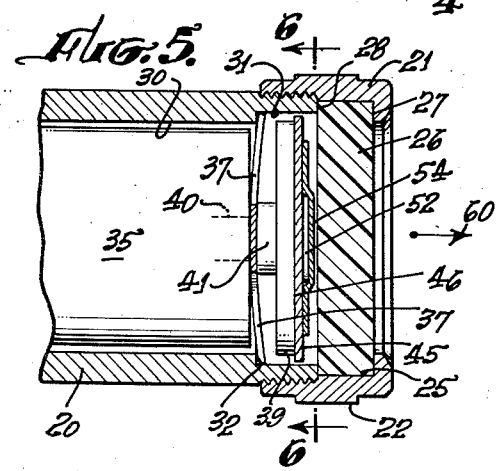
FIGURE 5 is a partial sectional view of the device of FIGURE 1 showing how it would appear after having been subjected to an accelerating force.
Figure 6:
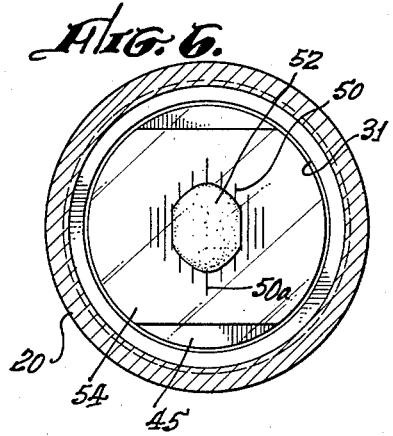
FIGURE 6 is a view taken along line 6–6 of FIGURE 5.

The displacement of the mass 35 within the casing 20 has in FIGURE 5, been assumed to be in the direction of arrow 60. Thus, the plastic deformable body 52 will be compressed between the disc 45 and the transparent disc 26 causing it to assume a flattened cross-section in the direction of the longitudinal axis of the casing 20. This flattening of the body 52 in the direction of the graduated lines 50 effectively serves to magnify the spring deflection produced by the movement of the mass 35 within the casing 20. This magnification of the movement of the mass is considered as a most salient feature of the present invention. It results from the fact that the body 52 which is initially substantially circular in cross-section, maintains its cross-sectional area. Under these conditions the "spread" exceeds the "squeeze" by a considerable amount. It has been found that a deflection of the spring 37 of the order of 0.02 inch results in a flattening of the body 52 and therefore an increase in the width dimension from 0.03 to 0.23 inch amounting to an effective magnification of 10 times. This is important because the mass motion must be small in an instrument for measuring short duration phenomena. In FIGURE 6 the body 52 is shown as it appears subsequent to deformation. It is clear that by reading the spread of the body by the aid of graduations 50 that a quick and efficient determination of the peak force or acceleration to which the crate has been subjected may readily be made. Any subsequent accelerating force whose magnitude exceeds that of the force which produced the deformation as indicated in FIGURE 6 will result in a further deformation of the body 52 thus providing a permanent visual record of the peak force to which a given system has been subjected.

In FIGURE 8 there is shown a first alternate embodiment of a mechanical transducer in accordance with the present invention. The device of FIGURE 8 is primarily adapted for use as a peak fluid pressure indicating device while the device hereinabove described is peculiarly adapted for use as an accelerometer. It will be apparent, however, that both devices are based upon similar principles and techniques for utilizing such principles.

The instrument of FIGURE 8 includes a substantially hollow cylindrical casing 70 which is open at its lower end. A threaded opening 72 is provided through the upper end 74 of the casing which opening is on the longitudinal axis thereof. A fluid pressure coupling 76 is threadably secured within opening 72. An inner container 71 or bellows defined by a flat bottom wall 78 and yieldable side walls 79 is fastened to the lower surface 81 of the upper end 74 of the casing 70. The lower surface 84 of the bottom wall 78 has a plurality of graduations similar to those shown in FIGURE 6. Alternatively a separate disc may be employed as with the first embodiment. Fastened to the bottom surface 84 is a body 85 of plastic deformable material. The material of body 85 and the means of fastening the same to the surface 84 may be similar to that described hereinabove with reference to the accelerometer embodiment, use being made of a strip of transparent tape. Secured to the bottom wall 90 of the casing 70 is a transparent cover member 92. Screws 95 are used to provide a seal between member 92 and casing 70. The walls 79 of the container 71 are made of a resilient material so that in the equilibrium position the body of deformable material 85 will retain its original shape. Upon the admission of a fluid under pressure through coupling 76 into container 71 the spring or resilient force of the walls 79 will be overcome resulting in a deformation or flattening of the body 85 as is shown in FIGURE 8. The extent of this deformation will, as has hereinabove been explained, in combination with the graduations upon surface 84 present a visual and permanent record of the maximum pressure of the system.

A mechanical force transducer in accordance with a second alternate embodiment of the present invention is shown in FIGURES 9 and 10. This device is in all respects similar to that of the device of FIGURE 8 with the exception of but a few components, hence most of the parts are similarly numbered. This device is intended to provide an indication of the peak force indicated by the arrow F in FIGURE 9. A force receiving rod 100 passes into casing 70 through opening 102 provided in the upper wall thereof. The rod 100 communicates with the bottom wall 78 in order to translate the motion from the rod to a flattening of the body 85. A bias spring 105 disposed between shoulder region 106 and the upper end 74 of the casing 70. This spring 105 together with the resilient force offered by the walls 79 in combination serves as the spring force which must be overcome by force F before deformation of the body 85 will take place.

Thus, a visual and permanent record of the maximum force F which has been applied to the system will be presented by viewing the flattening of the body 85 relative to the graduations upon surface 84 of the bottom wall 78. Here again, as with the device of FIGURE 8, a separate disc may be employed with the graduations appearing thereupon; this disc being disposed between the bottom wall 78 and the deformable body 85.

While the present invention has discussed a compressive force as that to be measured, such is not intended as a limitation of the invention. A tensile force may also be measured by a device in accordance with the present invention by the use of a yoke or a similar mechanical device which may be connected to the casing and rod member.

There has thus been described a new and improved peak acceleration recording instrument which is simple of design and rugged of construction. The device of the present invention provides a substantial magnification of the force being measured which provides for simple and efficient reading of the forces under consideration.

What is claimed as new is:

1. In a maximum fluid pressure indicator, the combination comprising: a generally hollow casing for receiving a fluid under pressure, said casing defining a first opening in one wall thereof; a chamber within said casing having a second opening therein communicating with said first opening in said one wall of said casing, said chamber being defined in part by yielding wall means, said yielding wall means being resilient; indicator means including a plate connected to said chamber at the end of said chamber opposite said second opening therein, said plate including a plurality of graduations upon the face thereof opposite said chamber; and, a plastic deformable body disposed upon said indicator means, said body being of a predetermined shape whereby when fluid under pressure is admitted within said chamber said plate urges said body against the wall of said casing opposite said one wall thereby to cause deformation of said body as it is compressed between said wall and said plate, the wall of said casing opposite said one wall being transparent.

2. In a maximum fluid pressure transducer the combination comprising: a generally hollow casing for receiving fluid under pressure, said casing defining a first opening in one wall thereof; a chamber within said casing having a second opening therein communicating with said first opening in said wall of said casing, said chamber defined in part by yielding wall means and an end plate, said yielding wall means being resilient; indicator means including said plate connected to said chamber at the end of said chamber opposite said second opening therein, said plate including a plurality of graduations upon the face thereof opposite said chamber; a plastic deformable body disposed between said indicator means and the wall of said casing opposite said first and second openings, the wall of said casing opposite said first and second openings being transparent, said body being of a predetermined shape whereby when fluid under pressure is admitted within said chamber said plate urges said body against the wall of said casing opposite said openings thereby to cause deformation of said body as it is compressed between said wall and said plate.

3. In a maximum force indicator the combination comprising: a generally hollow casing, said casing defining a first opening in one wall thereof; a chamber within said casing having a second opening therein communicating with said first opening in said wall of said casing, said chamber defined in part by yielding wall means and a bottom plate, said yielding wall means being resilient; a rod extending through said first and second openings and having one end thereof connected to said plate, the side of said plate opposite said rod having a series of graduations thereon; and, a plastic deformable body disposed between said plate and the wall of said casing opposite said plate, the wall of said casing opposite said plate being transparent, said body being of a predetermined shape whereby when a force is exerted upon said rod in a plane normal to said plate, said plate urges said body against the wall of said casing opposite said plate thereby to cause deformation of said body as it is compressed between said wall and said plate.

4. In a maximum force indicator the combination comprising: a force responsive element; a plastic deformable body affixed to one surface of said force responsive element, said one surface of said element having a series of graduations visible thereon; means coupled to said force responsive element for directing movement of said element along a predetermined axis passing through said one surface and for determining the rest position of said element along said predetermined axis; and, means for limiting the movement of said element along said predetermined axis, said limiting means being contiguous to said deformable body, when said element is in its rest position whereby axial movement of said force responsive element toward said limiting means will compress said deformable body between said element and said limiting means, the resulting lateral deformation of said body when viewed with respect to the graduations on said element surface providing a visual indication of the peak magnitude of force causing such deformation.

5. In a maximum force indicator the combination comprising: a case; a force responsive element; resilient means coupling said force responsive element to said case for controlling movement of said element with respect to said case along a predetermined axis and for determining the rest position of said element along said predetermined axis; a transparent plate affixed to said case proximate said force responsive element when said element is in its rest position, said plate being aligned in a plane normal to said predetermined axis; and, a plastic deformable body disposed between said force responsive element and said transparent plate whereby axial movement of said force responsive element toward said transparent plate will compress said deformable body between said element and said plate, the resulting lateral deformation of said body when viewed through said transparent plate providing a visual indication of the peak magnitude of force causing such deformation.

6. The combination described in claim 5 wherein said plastic deformable body is of a cylindrical shape and said body is disposed between said element and said plate with its cylindrical axis in perpendicular alignment with said predetermined axis.

7. In a shock gauge the combination comprising: a mounting member having a longitudinal axis; a mass, said mass being adapted to move longitudinally relative to said mounting member; resilient means connected to said mass and said mounting member to determine the initial position of said mass relative to said mounting member and to provide a restraining force to limit longitudinal movement of said mass; a body of plastic deformable material mounted to one end of said mass; and, transparent means connected to said mounting means adjacent to said plastic deformable body for limiting the longitudinal movement of said body relative to said mounting means thereby to cause deformation of said body upon such longitudinal movement towards said transparent limiting means.

8. In a peak linear accelerometer the combination comprising: a case having a longitudinal axis; a mass disposed within said case, said mass being adapted to move longitudinally within said case along said axis; resilient means connected to said mass to determine the initial position of said mass along said axis and to provide an axial restraining force to control movement of said mass along said axis; indicator means connected to one end of said mass, said indicator means including a transverse flat surface having a plurality of graduations thereon; rigid transparent means connected to said case adjacent said indicator means for limiting the maximum movement of said mass along said longitudinal axis; and a body of plastic deformable material disposed between said indicator means and said transparent means and substantially in contact therewith whereby said body will be deformed upon a change in position of said mass toward said transparent means and present a visual indication of the magnitude of the force causing said change in position.

9. A peak linear accelerometer including the combination of: a substantially cylindrical case having a longitudinal axis; a mass disposed within said case, said mass being adapted to move longitudinally within said case; a pair of resilient members connected near opposite ends of said mass, said resilient members being coupled to said case to determine the initial longitudinal position of said mass within said case and to restrain longitudinal movement of said mass; indicator means connected to an end of said mass, said indicator means including a disc which is aligned in a plane normal to said longitudinal axis, said disc including a plurality of graduations upon the face thereof opposite said mass; a plastic deformable body disposed upon said disc and partially overlying the graduations thereon, said body having a predetermined shape; and transparent means connected to said case for limiting the movement of said plastic deformable body along said longitudinal axis thereby to deform said body upon movement of said mass toward said transparent means.

10. In a peak linear accelerometer the combination comprising: a case having a longitudinal axis; a mass disposed within said case, said mass being adapted to move longitudinally within said case along said axis; spring means connected to said mass and to said case at opposite ends of said mass to determine the initial position of said mass along said axis and to apply a bias force upon said mass; a first body of plastic deformable material mounted to one end of said mass; a second body of plastic deformable material mounted to the other end of said mass; and, transparent means detachably coupled to each end of said case for limiting the movement of said mass along said longitudinal axis thereby to deform one of said bodies upon a change in position of said mass, said deformable bodies being of a shape which will deform in an amount which is a function of and substantially greater than said change of position.

11. A peak linear accelerometer including the combination of: a substantially cylindrical case having a longitudinal axis; a mass disposed within said case, said mass being adapted to move longitudinally within said case; a pair of spring members connected near opposite ends of said mass, said spring members being connected to said case to determine the initial longitudinal position of said mass within said case and to apply a bias force upon said mass along said axis; indicator means connected to said mass at opposite ends thereof, said indicator means including first and second discs, said first disc being connected to one end of said mass and said second disc being connected to the other end of said mass, said discs being aligned in a plane normal to said longitudinal axis, said discs including a plurality of graduations upon the faces thereof opposite said mass; a first plastic deformable body disposed upon said first disc; a second plastic deformable body disposed upon said second disc, said bodies having a predetermined shape; and, transparent means connected to said case for limiting the movement of said mass along said longitudinal axis thereby to deform one of said bodies upon a change in position of said mass produced by a force which exceeds that of said bias force, whereby said movement of said mass is magnified by a change in shape of the deformed body in a plane normal to said force.

References Cited in the file of this patent

UNITED STATES PATENTS

| | | |
|---|---|---|
| 2,362,484 | Hickman | Nov. 14, 1944 |
| 2,454,793 | Grogan et al. | Nov. 30, 1948 |
| 2,574,600 | Stokes | Nov. 13, 1951 |
| 2,601,440 | Kerrigan | June 24, 1952 |
| 2,666,409 | Kane | Jan. 19, 1954 |
| 2,767,973 | Ter Veen et al. | Oct. 23, 1956 |

FOREIGN PATENTS

| | | |
|---|---|---|
| 1,145,559 | France | May 6, 1957 |